United States Patent

Kakalec et al.

[11] Patent Number: 5,804,890
[45] Date of Patent: Sep. 8, 1998

[54] DIRECT CURRENT VOLTAGE POWER BACKUP SYSTEM

[75] Inventors: Robert J. Kakalec, Madison, N.J.; John S. Pendergrass, Grand Prairie, Tex.

[73] Assignee: Lucent Technologies Inc., Murray Hill, N.J.

[21] Appl. No.: 815,285

[22] Filed: Mar. 11, 1997

Related U.S. Application Data

[63] Continuation-in-part of Ser. No. 805,093, Feb. 24, 1997, which is a continuation of Ser. No. 499,513, Jul. 7, 1995, abandoned.

[51] Int. Cl.⁶ ........................................... H02J 7/00
[52] U.S. Cl. .................. 307/64; 307/6; 307/65; 307/66
[58] Field of Search ................... 307/64, 65, 66, 307/43, 44, 45, 46

[56] References Cited

U.S. PATENT DOCUMENTS

| | | |
|---|---|---|
| 3,968,417 | 7/1976 | Dials . |
| 4,158,224 | 6/1979 | Kreyer et al. . |
| 4,435,743 | 3/1984 | Plumly . |
| 4,719,550 | 1/1988 | Powell et al. ........................ 363/37 |
| 5,001,621 | 3/1991 | Egawa . |
| 5,483,108 | 1/1996 | Girard et al. . |

Primary Examiner—William M. Shoop, Jr.
Assistant Examiner—Kim Lockett

[57] ABSTRACT

A reserve power system for a commercial AC load provides DC power to the load when the primary power fails by providing direct current voltage power from a DC power source which enables the load to continue to operate in a normal fashion. A power system supplying commercial AC derived power to a load provides backup power by coupling DC power to the load when the primary AC power fails. AC power is supplied to a primary winding of a power transformer which also has a secondary winding side. A cable is connected, at a first end, to the secondary winding side and at a second end to a load powered by a commercial AC voltage. A battery DC voltage source and a battery charger are connected to the secondary winding side of the power transformer. The battery charger maintains the integrity of the reserve power. A voltage monitoring circuit connected to the power transformer detects a primary power failure and activates switching circuitry for connecting the DC voltage source directly to the load. A commercial AC load allows a DC voltage to be used for temporary power without adversely affecting the power cabling.

6 Claims, 1 Drawing Sheet

DIRECT CURRENT VOLTAGE POWER BACKUP SYSTEM

This is a Continuation-in-Part of U.S. patent application No. 08/805,093, filed Feb. 24, 1997, which is a continuation of 08/499,513, filed Jul. 7, 1995, now abandoned.

BACKGROUND OF THE INVENTION

1. Field of Invention

This invention relates to power systems and, in particular, to a system arrangement to provide reserve power to backup AC line power where the connected equipment can be powered either by AC or DC voltage.

2. Description of Related Art

Typically, when using an AC power supply to drive a load, if the AC power is removed then it is desirous to supply backup power in the form of AC power. However, backup AC systems require particular switching and control systems which are typically very complicated, sophisticated and expensive. The reserve power for an AC line power source system is usually supplied by a backup battery coupled to an inverter. The inverter is connected to an AC powered load upon failure of the primary AC line power. The inverter provides an AC waveform of high quality. However, the use of an inverter presents various drawbacks including reduced efficiency, reliability and increased system size. Use of the inverter to convert the DC signal to an AC signal for use with the load can be complicated if complex and damaging signal transients are to be avoided.

Systems using inverters generally require a complex backup switching system. The AC backup systems are typically fast switching which will provide virtually immediate backup power. For example, in a telephone system if power is lost for a very brief period then the call will be lost. This will be a significant annoyance to a customer/user. In such an instance, a fast switching AC backup supply is desirable to ensure the call is not lost. However, there are other situations wherein a brief loss of power will not have a dramatic effect on the service, for example, in the supply of video information, such as television signals. If a video feed loses its primary power and then regains power through the backup system, the video will not be lost but merely interrupted. Therein, the option to use a slower switch for coupling the backup system to the load may be utilized. However, another consideration when determining what type of backup system to use for AC powered systems is the medium over which the power signal will be supplied. For example, when AC power is supplied via a cable, such as a coaxial cable, the signal may travel long distances and at various voltages without serious negative effect on the cable. However, it is known that if DC voltage is transmitted over a coaxial cable for an extended period of time, the voltage will have a significant corrosive effect on the cable. Therefore, DC voltage backup power is not preferred for systems using AC power as the primary power source wherein the power is supplied over a coaxial cable.

Uninterruptable power systems use a Ferroresonant transformer, also known as a voltage stabilizer or a Ferro transformer, which couples the AC source and a battery connected through an inverter through the Ferro transformer to provide an AC signal to energize a load. In such a system, it is necessary to synchronize the inverter with the primary AC power source in order to avoid power transfer failures. The synchronization requires complicated control systems. Such systems introduce various drawbacks, for example, reliability and expense.

SUMMARY OF THE INVENTION

This invention provides a method and apparatus which addresses the shortcomings of the conventional backup power systems.

The invention provides a reserve power system which substitutes DC backup power in a system utilizing AC primary power.

The invention further provides a reserve power system which enables a normally AC powered load to operate in a normal fashion from DC backup power.

The invention further provides a reserve power system which utilizes DC backup power in a system transferring the power via a coaxial cable.

The invention further provides a backup power system to replace a primary power source and allow the system load to continue to operate in a normal fashion.

In an exemplary embodiment, the present invention provides an AC power system including a reserve power system which provides backup power in the form of a DC signal when the primary AC power temporarily goes off-line. During normal operation, the AC power system provides an AC power signal to a load. However, when the primary AC power goes off-line, either intentionally, for example, due to maintenance requirements, or unintentionally, for example, due to AC power failure, the reserve power system provides direct DC backup power from a DC power source to the load. The DC backup power allows the load to continue operation in a normal fashion, without significant adverse effects on the system.

The power system, which normally supplies AC derived power to a commercial AC load in the exemplary embodiment, switches to provide DC backup power by coupling a DC power source directly to the load when the AC power supply is off-line. AC power is normally supplied through a primary winding of a power transformer. The transformer has a secondary winding normally connected to a cable, for example, a coaxial cable. The cable, in turn, is connected to a load. The load is normally powered by and operates off a commercial AC voltage. The power system includes a reserve power system. The reserve power system includes a DC voltage source in the form of a battery and a battery charger coupled to the battery. The battery charger is connected to another winding of the power transformer. The battery charger maintains the integrity of the reserve power.

The power system also includes a voltage detection circuit which monitors and detects the status of the primary AC power. If the voltage detection circuit detects that the primary AC power has gone off-line, it activates a switching circuit. The switching circuit disconnects the primary AC voltage source from the load and connects the DC voltage source directly to the load.

As the load is typically a commercial AC load, the backup DC voltage may temporarily power the load without adversely effecting either the load or the power cable. The adverse effects typically brought on by long term DC power supply can include corrosion of the cable. As the DC power signal is typically supplied infrequently and for short periods of time, the DC signal has minimal effect on the coaxial cable. For example, backup power is supplied to a system via a coaxial cable for approximately a couple hours over the twenty year lifetime of the coaxial cable life.

DETAILED DESCRIPTION OF PREFERRED EMBODIMENTS

Figure 1:
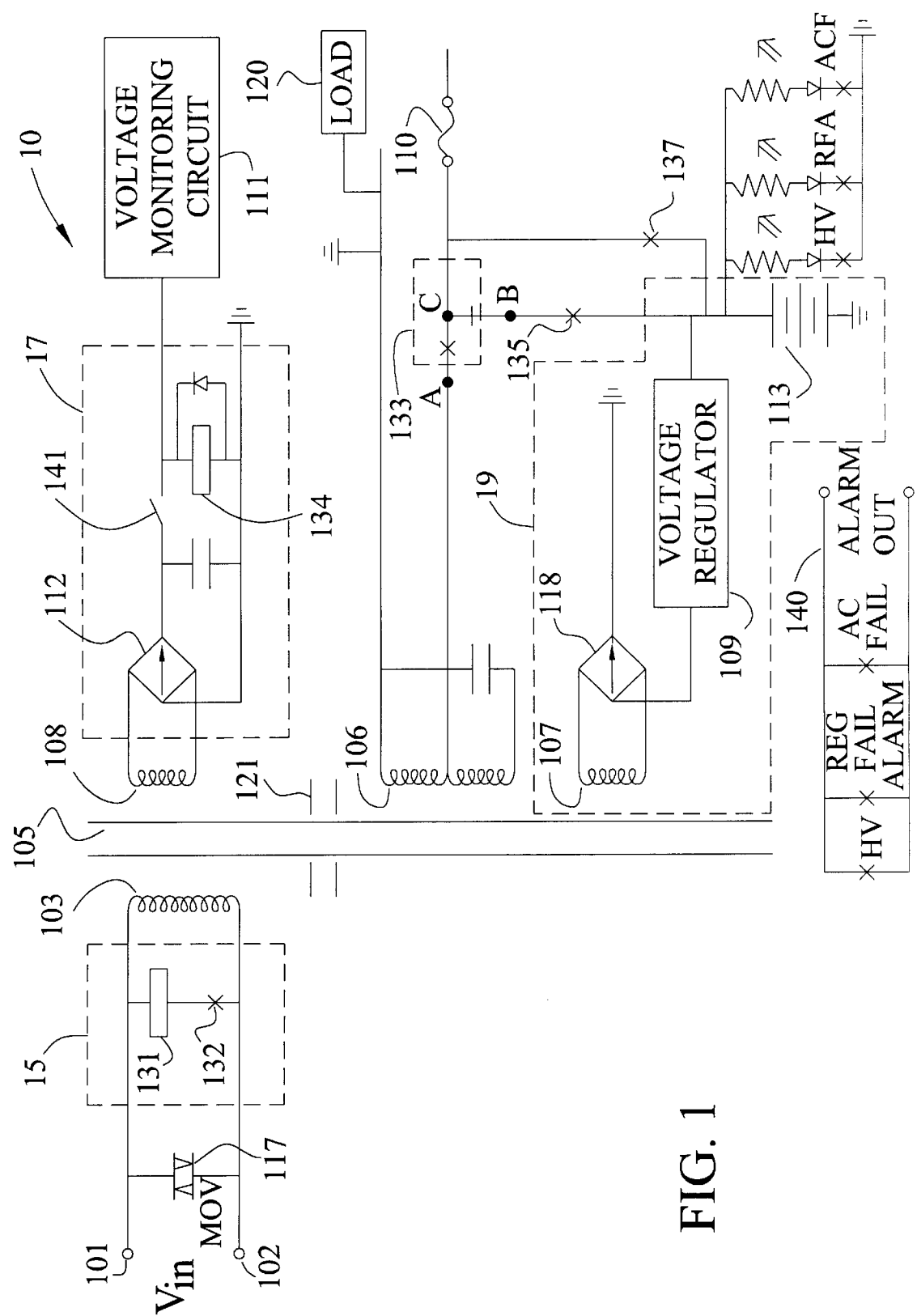
FIG. 1 is a schematic of a power system for providing backup power to a commercial AC load in accordance with a preferred embodiment of the present invention.

It is envisioned that the present invention will function with AC voltage inputs and loads that may vary dramatically from typical commercial loads. FIG. 1 is a schematic of a power system for providing backup power to a commercial AC load in accordance with a preferred embodiment of the present invention. A primary AC power source (not shown) may be coupled to the power system 10 at input terminals 101 and 102. The primary AC power source provides an input AC voltage $V_{in}$. Terminals 101 and 102 are connected to an input/primary winding 103 of a Ferro power transformer 105. An output secondary winding 106, in the exemplary embodiment, is connected to a coaxial cable 110 which in turn is connected to a commercial AC load 120.

The power system 10 includes a voltage monitoring circuit 111. The voltage monitoring circuit 111 is connected, to a third transformer winding 108 via a power-up circuit 17. The power-up circuit 17 includes a full wave rectifier 112, ON/OFF switch 141, and a low power relay coil 134. The voltage monitoring circuit 111 monitors the status of the input AC voltage $V_{in}$ and activates appropriate alarms 140 if primary AC voltage goes off-line.

A reserve power system 19 includes a fourth winding 107. The fourth winding 107 is connected to a full wave rectifier 118, which is in turn connected to a battery charging regulator 109. The battery charging regulator 109 is connected to a battery 113. Battery 113 serves as a source of reserve DC voltage. Ferro transformer shunts 121 isolate the input and third windings from the second and fourth output windings.

Power system 10 further includes an input voltage detector 15. The input voltage detector 15 includes a series connection of a relay contactor 131 and a contact switch 132.

Power system 10 further includes switching circuitry for disconnecting the primary AC power source and connecting the backup DC power supply battery 113, to the load 120 and vice-versa. The switching circuitry includes transfer contact switch 133. In a preferred embodiment, transfer contact switch 133 may reside in two states. In a first state, illustrated in FIG. 1, transfer contact switch 133 couples node C and node A. In this first state, the primary AC power source is coupled to the load 120. In a second state, transfer contact switch 133 couples node C and node B. In this second state, the reserve DC power source, battery 113 is coupled to the load 120. The relay contactor 131 controls the contact switch 133. Contact switch 133 in turn controls the connection of the secondary winding 106 to the coaxial cable 110. Contact switch 132 is controlled by relay coil 134. Relay coil 134 is connected to the winding 108 through the rectifier 112. The contact switch 132 is closed and conducting as long as relay coil 134 is energized by voltage derived from the input AC voltage and on-off switch 141 is closed. The contact switch 135, connecting battery 113 to the coaxial cable 110, is controlled by on-off switch 141. Contact switch 135 is closed when switch 141 is closed and open when switch 141 is open. MOV 117 shunts the input to provide surge protection.

In operation and in the presence of AC power, AC power is supplied to the input terminals 101 and 102 and applied to the primary winding 103 of the transformer 105. ON/OFF switch 141 is manually closed in order to initialize the system. Upon closing switch 141, contact switch 135 is also closed. Contact switch 135 serves as a breaker. In the event maintenance must be performed on the system, ON/OFF switch 141 may be opened. This in turn opens contact switch 135. This allows for removal of both AC power and DC power. Further, upon closing switch 141, relay coil 134 is energized. In response to relay coil 134 being energized, contact switch 132 is closed. Once contact switch 132 closes, relay contactor 131 is energized. When relay contactor 131 is energized, transfer contact switch 133 is placed into its first state. As stated above, this couples the AC power to cable 110. The AC voltage energy is magnetically coupled to secondary/output winding 106.

When the primary AC power is on-line, winding 107 supplies power through rectifier 118 to the battery charging regulator 109 to charge the battery 113. When the primary AC voltage goes off-line, the voltage of winding 103 drops which de-energizes relay contactor 131. When relay contactor 131 is de-energized, transfer contact switch 133 is placed into its second state, coupling the battery 113 to the coaxial cable 110 and disconnecting the winding 106 from the coaxial cable 110. Therein, the DC voltage of battery 113 is applied to the cable 110 and to the load 120. The battery 113 supplies DC voltage at a level equivalent or substantially equivalent to the AC voltage level supplied by the primary AC power source during normal operation of the power system 10. The power system 10 is operating normally when the primary AC power source is supplying AC power to the load 120. A manual bypass switch 137 allows the direct manual connection of the battery 113 to the cable 110 should the automatic system fail. The bypass switch 137 also permits maintenance to the power system without interruption of the output load current.

While the invention has been described in connection with preferred embodiments, it is to be understood that the invention is in no way restricted to the embodiments described herein. Various changes, modifications, or improvements may be made in the invention without departing from the spirit of the invention, and without exceeding the scope of the invention as expressed in the following claims.

What is claimed is:

1. A power system, comprising:

an input for accepting AC voltage;

a power transformer having a primary winding connected to the input, a secondary winding side, having at least one winding and providing an AC voltage;

an output terminal for outputting a voltage;

a backup terminal connected to a DC voltage source, the DC voltage source supplying a DC voltage substantially equivalent to the AC voltage directly to a load; and switching circuitry for selectively connecting the output terminal to one of the secondary winding side and the backup terminal.

2. The power system as recited in claim 1, further comprising voltage loss detection circuitry connected to the power transformer for detecting a loss of AC power and supplying a control signal indicating the loss of AC power, wherein the switching circuitry is coupled to the voltage loss detection circuitry and responds to the control signal to selectively connect the output.

3. The power system as recited in claim 1, wherein the DC voltage source comprises a battery and a battery charger connected in series and energized by the secondary winding side.

4. A power system as recited in claim 2, wherein the voltage loss detection circuitry is connected to the power transformer via the primary winding.

5. A direct current voltage backup power system, comprising:

an input for accepting AC voltage;

an output for supplying a load to be energized with the AC voltage;

a terminal for accepting a reserve DC voltage source;

a power transformer having a primary winding connected to the input, a secondary winding connected to the output and a third winding connected to the terminal;

voltage loss detection circuitry connected to the power transformer for detecting a loss of AC power;

switching circuitry responsive to the voltage loss detection circuitry for connecting the DC voltage source directly to the load, wherein the DC voltage level is substantially equivalent to the AC voltage level.

6. A direct current voltage backup power system, comprising:

an input for accepting AC voltage;

an output, coupled to a first node of a coaxial cable, for supplying the AC voltage via the coaxial cable to a load coupled to a second node of the coaxial cable;

a terminal for accepting a reserve DC voltage source;

a power transformer having a primary winding connected to the input, a secondary winding connected to the output and a third winding connected to the terminal;

voltage loss detection circuitry connected to the power transformer for detecting a loss of AC power;

switching circuitry responsive to the voltage loss detection circuitry for connecting the terminal directly to the coaxial cable.

* * * * *